(12) United States Patent
Kumai

(10) Patent No.: US 8,205,992 B2
(45) Date of Patent: Jun. 26, 2012

(54) POLARIZATION ELEMENT AND PROJECTION DISPLAY DEVICE

(75) Inventor: Yoshitomo Kumai, Okaya (JP)

(73) Assignee: Seiko Epson Corporation (JP)

( * ) Notice: Subject to any disclaimer, the term of this patent is extended or adjusted under 35 U.S.C. 154(b) by 312 days.

(21) Appl. No.: 12/711,566

(22) Filed: Feb. 24, 2010

(65) Prior Publication Data
US 2010/0225886 A1  Sep. 9, 2010

(30) Foreign Application Priority Data

Mar. 6, 2009  (JP) ................................. 2009-054118

(51) Int. Cl.
*G03B 21/14* (2006.01)
(52) U.S. Cl. ................. 353/20; 353/30; 353/31; 353/34; 353/37; 353/38; 353/102; 353/122; 359/485.05
(58) Field of Classification Search .................... 353/20, 353/30, 31, 34, 37, 38, 102, 122; 359/485.01, 359/485.02, 485.03, 485.04, 486.01, 486.02, 359/486.03, 485.05, 487.03, 352; 349/5, 349/7, 8, 9, 96–103
See application file for complete search history.

(56) References Cited

U.S. PATENT DOCUMENTS

| | | | |
|---|---|---|---|
| 6,665,119 B1 * | 12/2003 | Kurtz et al. | 359/484.08 |
| 6,785,050 B2 * | 8/2004 | Lines et al. | 359/485.03 |
| 6,829,090 B2 * | 12/2004 | Katsumata et al. | 359/485.04 |
| 7,233,563 B2 | 6/2007 | Ueki et al. | |
| 7,957,062 B2 * | 6/2011 | Takada | 349/96 |
| 2003/0072079 A1 * | 4/2003 | Silverstein et al. | 359/486 |
| 2006/0087602 A1 * | 4/2006 | Kunisada et al. | 349/96 |
| 2007/0165307 A1 * | 7/2007 | Perkins | 359/486 |
| 2007/0217008 A1 * | 9/2007 | Wang et al. | 359/486 |
| 2007/0296921 A1 * | 12/2007 | Wang et al. | 353/20 |
| 2008/0252825 A1 * | 10/2008 | Kim et al. | 349/96 |

FOREIGN PATENT DOCUMENTS

| | | |
|---|---|---|
| JP | 2005-037900 | 2/2005 |
| JP | 2007-148344 | 6/2007 |

* cited by examiner

*Primary Examiner* — Georgia Y Epps
*Assistant Examiner* — Sultan Chowdhury
(74) *Attorney, Agent, or Firm* — Harness, Dickey & Pierce, P.L.C.

(57) ABSTRACT

A polarization element includes: a substrate; a plurality of convex line sections on one surface of the substrate and forming stripes in a plan view; and a multilayer thin line provided to each convex line section and extending along the convex line sections, wherein the multilayer thin line has a lower layer on the convex line section, and an upper layer stacked on the lower layer, the lower layer and the upper layer each have a first thin line on one side surface in a direction along a shorter dimension of the convex line section, and a second thin line on the other side surface, the materials of the lower layer first thin line and the upper layer first thin line are different from each other, and the materials of the lower layer second thin line and the upper layer second thin line are different from each other.

13 Claims, 8 Drawing Sheets

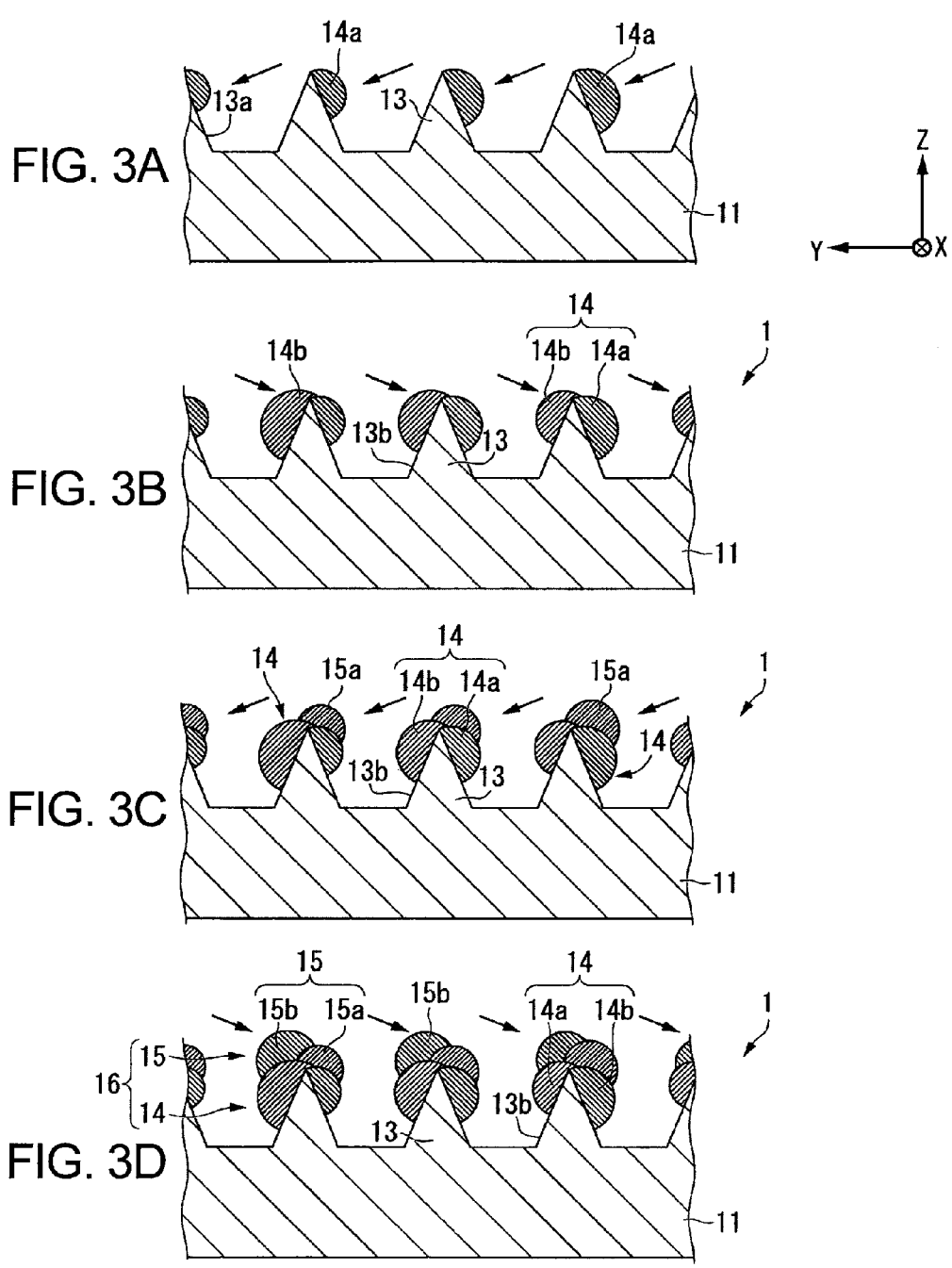

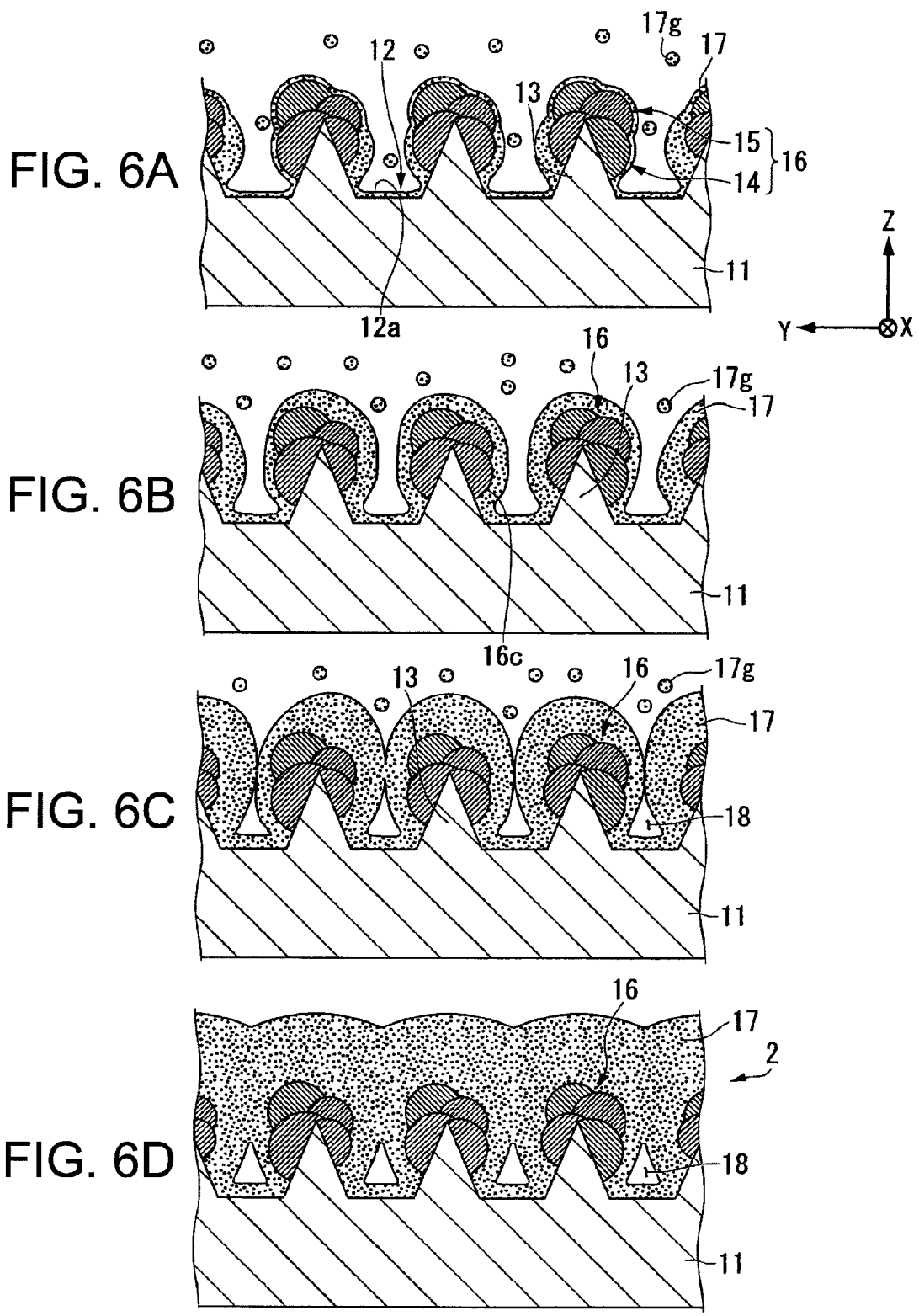

POLARIZATION ELEMENT AND PROJECTION DISPLAY DEVICE

BACKGROUND

1. Technical Field

The present invention relates to a polarization element.

2. Related Art

As light modulation devices of various types of electro-optic devices, there are used liquid crystal devices. As a structure of the liquid crystal device, there is widely known a structure in which the liquid crystal layer is sandwiched between a pair of substrates disposed so as to be opposed to each other, and a polarization element for inputting the light with predetermined polarization into the liquid crystal layer and an oriented film for controlling the arrangement of the liquid crystal molecules when no voltage is applied thereto are typically provided.

As the polarization element, there are known a film type polarization element manufactured by stretching a resin film including iodine or dichroic dye in one direction thereby orienting the iodine or the dichroic dye in the stretching direction, and a wire-grid type polarization element formed by paving the surface of a transparent substrate with nano-scale thin lines.

The wire-grid type polarization element is made of an inorganic material, and therefore, has an advantage of being superior in heat resistance, and is preferably used in a place where heat resistance is particularly required. For example, it is preferably used as a polarization element for a light valve of a liquid crystal projector. As such a wire-grid polarization element as described above, there is disclosed a technology described in JP-A-2007-148344 (Document 1), for example.

In the Document 1, a metallic material is deposited using an oblique sputtering method executed in a tilted direction on concavo-convex portions formed on the substrate, and the metal microparticulate layer thus deposited is used as the thin lines, instead of using the related art method of forming the thin lines by patterning the metal film by etching. According to the Document 1, the method can provide the polarization element having a desired polarization property in the visible light range, and high productivity.

However, in the polarization element of the related art described above, there arises a problem that when the thin lines are formed at the convex portions on the substrate by executing the oblique sputtering, unevenness is caused in the amount of deposition of the inorganic microparticles as a material of the thin lines depending on the position in the surface of the substrate. In other words, in the method described in the Document 1, the distance from the material source of the metallic material varies in accordance with the position on the surface of the substrate. Therefore, there arises unevenness of about ±50% of the target size in each of the metallic materials deposited thereon depending on the position on the surface of the substrate. If the unevenness is caused in the size of the metallic material, the parameters closely related to the optical solid state properties of the polarization element, such as the distance between the adjacent thin lines, or the width or the height of the thin line vary, and therefore, it is not achievable to express the uniform optical solid state properties throughout the entire polarization element.

SUMMARY

An advantage of some aspects of the invention is to provide a polarization element having high light resistance and expressing optical solid state properties more uniform than those in the related art.

A polarization element according to an aspect of the invention includes a substrate, a plurality of convex line sections disposed on one surface of the substrate so as to form substantial stripes in a plan view, and a multilayer thin line provided to each of the convex line sections and extending along an extending direction of the convex line sections, and the multilayer thin line has a lower layer thin line disposed on the convex line section, and an upper layer thin line stacked on the lower layer thin line, the lower layer thin line and the upper layer thin line each have a first thin line disposed on one side surface out of both side surfaces in a direction along a shorter dimension of the convex line section, and a second thin line disposed on the other side surface, materials of the first thin line belonging to the lower layer thin line and the first thin line belonging to the upper layer thin line are different from each other, and materials of the second thin line belonging to the lower layer thin line and the second thin line belonging to the upper layer thin line are different from each other.

By adopting such a configuration, it becomes possible to make the first thin line of the upper layer thin line and the first thin line of the lower layer thin line different from each other in the light reflecting property and the light absorbing property. Further, it becomes possible to make the second thin line of the upper layer thin line and the second thin line of the lower layer thin line different from each other in the light reflecting property and the light absorbing property. Thus, it is possible to adjust the light reflecting property and the light absorbing property of the upper layer thin lines and the lower layer thin lines to thereby adjust the light reflecting property and the light absorbing property of the multilayer thin lines. Therefore, according to the polarization element of this aspect of invention, it is possible to obtain the polarization element improving the transmission, the light absorptance, and the display contrast than ever before, and satisfying the required characteristics.

Further, according to another aspect of the invention, in the polarization element according to the above aspect of the invention, the materials of the first thin line and the second thin line belonging to the lower layer thin line are the same, and the materials of the first thin line and the second thin line belonging to the upper layer thin line are the same.

By adopting such a configuration, it becomes possible to make the function of the lower layer thin line and the function of the upper layer thin line different from each other. Further, it becomes possible to make the formation of the lower layer thin line and the upper layer thin line easier.

Further, according to still another aspect of the invention, in the polarization element according to the above aspect of the invention, the entire lower layer thin line is covered by the upper layer thin line.

By adopting such a configuration, it becomes possible to prevent the deterioration of the lower layer thin line to thereby prevent the polarization splitting function from being deteriorated.

Further, according to yet another aspect of the invention, in the polarization element according to the above aspect of the invention, the first thin line and the second thin line are made of one of a light reflecting material having a relatively high light reflecting and a light absorbing material having a relatively high light absorbing property.

By adopting such a configuration, it becomes possible to form the first thin line and the second thin line having the high light reflectivity. Further, it becomes possible to form the first thin line and the second thin line having the high light absorptance. Thus, it is possible to provide the desired light reflecting property and light absorbing property respectively to the lower layer thin lines and the upper layer thin lines.

Further, according to still yet another aspect of the invention, in the polarization element according to the above aspect of the invention, the first thin line and the second thin line belonging to the lower layer thin line are made of the light reflecting material, and the first thin line and the second thin line belonging to the upper layer thin line are made of the light absorbing material.

By adopting such a configuration, it is possible to ensure the desired light absorbing property by the upper layer thin lines while ensuring the desired light reflectivity by the lower layer thin lines. Thus, it is possible to improve the display contrast in the case of applying the polarization element to the display device.

Further, according to further another aspect of the invention, in the polarization element according to the above aspect of the invention, in the lower layer thin lines adjacent to each other, volumes of the first thin lines are different from each other, volumes of the second thin lines are different from each other, and volumes of the lower layer thin lines are substantially the same as each other, the volumes of the first thin lines continuously descend in a direction in which a distance from one end of the substrate increases, and the volumes of the second thin lines continuously descend in a direction in which a distance from the other end of the substrate increases.

By adopting such a configuration, the unevenness in the volumes of the first thin lines caused in the direction from the one end of the substrate toward the other end thereof is canceled by the unevenness in the volumes of the second thin lines caused in the direction from the other end of the substrate toward the one end thereof. Therefore, even in the case in which the lower layer thin lines are formed using the oblique sputtering method apt to cause unevenness in the amount of deposition of the sputtered particles depending on the distance from the target, the lower layer thin lines with uniform volumes can be formed.

Further, according to still further another aspect of the invention, in the polarization element according to the above aspect of the invention, in the upper layer thin lines adjacent to each other, volumes of the first thin lines are different from each other, volumes of the second thin lines are different from each other, and volumes of the upper layer thin lines are substantially the same as each other, the volumes of the first thin lines continuously descend in a direction in which a distance from one end of the substrate increases, and the volumes of the second thin lines continuously descend in a direction in which a distance from the other end of the substrate increases.

By adopting such a configuration, the unevenness in the volumes of the first thin lines caused in the direction from the one end of the substrate toward the other end thereof is canceled by the unevenness in the volumes of the second thin lines caused in the direction from the other end of the substrate toward the one end thereof. Therefore, even in the case in which the upper layer thin lines are formed using the oblique sputtering method apt to cause unevenness in the amount of deposition of the sputtered particles depending on the distance from the target, the upper layer thin lines with uniform volumes can be formed.

Further, according to yet further another aspect of the invention, in the polarization element according to the above aspect of the invention, a protective film covering the convex line sections and the multilayer thin lines is provided, and in an area between the convex line sections and the multilayer thin lines adjacent to each other, there is formed a void section unfilled with the protective film.

By adopting such a configuration, since the void section is formed in the area between the convex line sections and the metallic thin lines adjacent to each other, an area between the metallic thin lines are not buried with the protective film, and the polarization element provided with superior optical characteristics can be obtained.

Further, according to still yet further another aspect of the invention, in the polarization element according to the above aspect of the invention, the protective films respectively covering the convex line sections and the multilayer thin lines adjacent to each other have contact with each other at the top of the void section to cover the void section.

By adopting such a configuration, the void section capable of encapsulating the air or the ambient gas used in the manufacturing process (or being kept vacuum) can be formed between the metallic thin lines. Therefore, the polarization element having the superior optical characteristics can be obtained.

Further, according to a further aspect of the invention, in the polarization element according to the above aspect of the invention, the protective film is formed from a translucent insulating material.

By adopting such a configuration, since the metallic thin lines are isolated from the periphery, in the case of setting the polarization element in the device, for example, it can be prevented that the metallic thin lines and the wiring of the device unwillingly have electrical contact with each other, thus providing an electronic device capable of stable operation.

Further, according to a still further aspect of the invention, in the polarization element according to the above aspect of the invention, the light reflecting material is selected from the group consisting of aluminum, gold, silver, copper, chromium, titanium, nickel, tungsten, and iron, and the light absorbing material is selected from the group consisting of silicon, germanium, molybdenum, and tellurium.

By adopting such a configuration, the light reflecting material having the desired reflectivity can be obtained, and the light absorbing material having the desired light absorbing property can be obtained. Further, since these half-metallic materials are hard to be oxidized, the polarization element hard to be deteriorated and with high reliability can be obtained. In particular, when the polarization element is used in an application in which the temperature thereof becomes high, although the oxidation reaction is accelerated under the high temperature environment, by using these half-metallic materials, it becomes possible to make the polarization element with high durability.

BRIEF DESCRIPTION OF THE DRAWINGS

The invention will now be described with reference to the accompanying drawings, wherein like numbers reference like elements.

FIGS. 3A through 3D are cross-sectional process charts showing the manufacturing process of the polarization element according to the first embodiment.

FIGS. 6A through 6D are cross-sectional process charts showing a manufacturing process of the polarization element according to the second embodiment.

DESCRIPTION OF EXEMPLARY EMBODIMENTS

First Embodiment

Figure 1A:
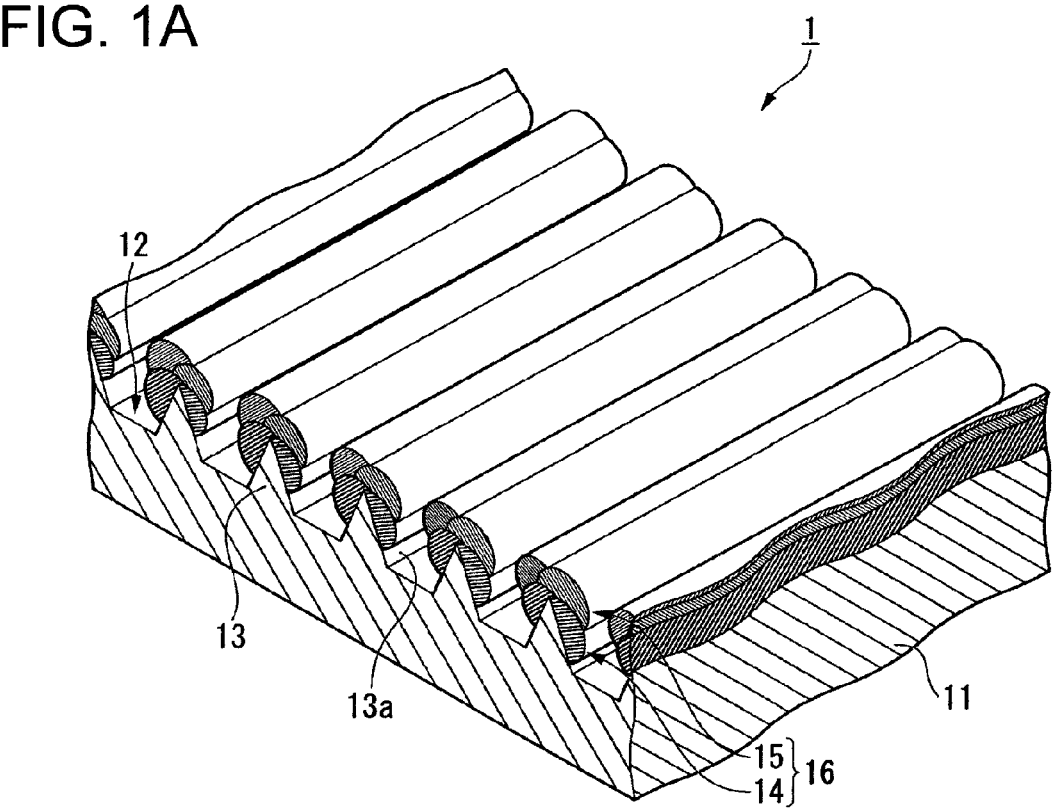
FIGS. 1A and 1B are schematic diagrams of a polarization element according to a first embodiment of the invention.
Figure 1B:
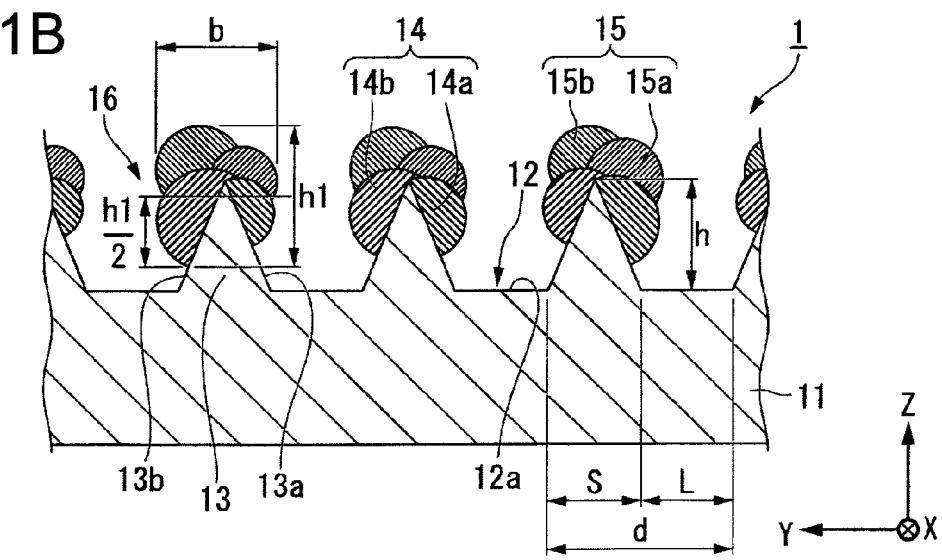

A polarization element according to a first embodiment of the invention will hereinafter be explained with reference to the accompanying drawings. FIG. 1A is a schematic perspective view showing a schematic configuration of the polarization element according to the present embodiment, and FIG. 1B is a schematic cross-sectional view of the polarization element when cutting the polarization element by a Y-Z plane.

It should be noted that in the following explanations, an XYZ coordinate system is assumed, and positional relationships between the respective members will be explained with reference to the XYZ coordinate system. In this case, it is assumed that a predetermined direction in a horizontal plane is an X-axis direction, a direction perpendicular to the X-axis direction in the horizontal plane is a Y-axis direction, a direction perpendicular to both of the X-axis direction and the Y-axis direction in a vertical plane is a Z-axis direction. In the case of the present embodiment, an extending direction of the thin lines is assumed to be the X-axis direction, and the arranging axis of the thin lines is assumed to be the Y-axis direction. Further, in all of the drawings described below, the ratios between the film thicknesses or the sizes of the constituents are made appropriately different from each other in order for making the drawings eye-friendly.

As shown in FIG. 1A, the polarization element 1 is provided with a substrate 11.

The substrate 11 has a translucent material such as glass, quartz, or plastic as the constituent material. Since the polarization element 1 accumulates heat to become in a high temperature state depending on the purpose to which the polarization element 1 is applied, the substrate 11 preferably has glass or quartz having high heat resistance as the constituent material.

On the surface (either one surface) of the substrate 11, there is formed a plurality of groove sections 12 extending in the X-axis direction. A plurality of convex line sections 13 extending in the X-axis direction each located between the respective groove sections 12 is disposed so as to form substantial stripes in a plan view. The groove sections 12 are formed with the pitch shorter than the wavelength of the visible light in the Y-axis direction with constant intervals, and the convex line sections 13 are also arranged with the same pitch.

As shown in FIG. 1B, the convex line sections 13 each have a triangular cross-sectional shape, and the side surfaces 13a, 13b thereof are formed obliquely so as to form a shape tapering along a direction in which the distance from the bottom surface 12a is increased. The dimensions of the groove sections 12 and the convex line sections 13 are as follows. For example, the height h of each of the convex line sections 13 is 100 nm, the width S thereof is 70 nm, the width L of the bottom surface 12a is 70 nm, the pitch d thereof is 140 nm.

As shown in FIG. 1A, on each of the convex line sections 13, there is disposed a multilayer thin line 16 formed so as to extend on the substrate 11 in one direction and composed of a lower layer thin line 14 and an upper layer thin line 15.

As shown in FIG. 1B, the lower layer thin line 14 is attached so as to straddle the both side surfaces (tilted surfaces) 13a, 13b of the convex line section 13, and is formed so as to extend in the X-axis direction identical to the extending direction of the convex line section 13.

The upper layer thin line 15 is formed so as to be stacked on the lower layer thin line 14, and is attached so as to straddle the both side surfaces (tilted surfaces) 13a, 13b of the convex line sections 13 similarly to the case of the lower layer thin line 14. Further, the upper layer thin line 15 is formed so as to extend in the X-axis direction identical to the extending direction of the convex line section 13.

The lower layer thin line 14 and the upper layer thin line 15 have first thin lines 14a, 15a and second thin lines 14b, 15b, respectively. The first thin lines 14a, 15a are formed on one side surface 13a of the convex line section 13, and the second thin lines 14b, 15b are formed on the other side surface 13b of the convex line section 13.

The first thin line 14a and the second thin line 14b belonging to the lower layer thin line 14 are made of the same material. As the constituent material thereof, there is used a light reflecting material having relatively high light reflectivity, such as a metallic material like aluminum (Al).

Further, the first thin line 15a and the second thin line 15b belonging to the upper layer thin line 15 are made of the same material. As the constituent material thereof, there is used a light absorbing material having relatively high light absorbing property, such as a half-metallic material like germanium (Ge).

In the present embodiment, in the lower layer thin lines 14, 14 adjacent to each other, the first thin lines 14a, 14a are different in volume from each other. Specifically, the volume of the first thin line 14a formed on one side surface 13a of the convex line section 13 is gradually decreased as the distance of the first thin line 14a from one end (an end portion on the negative side of the Y-axis) of the substrate 11 increases and the position of the first thin line 14a comes closer to the other end (an end portion on the positive side of the Y-axis) of the substrate 11 as shown in FIG. 1B. In other words, the volume of the first thin line 14a is continuously reduced along the direction in which the distance from the one end of the substrate 11 increases.

Further, in the lower layer thin lines 14, 14 adjacent to each other, the second thin lines 14b, 14b are also different in volume from each other. Specifically, the volume of the second thin line 14b formed on the other side surface 13b of the convex line section 13 is gradually decreased as the distance of the second thin line 14b from the other end (the end portion on the positive side of the Y-axis) of the substrate 11 increases and the position of the second thin line 14b comes closer to the one end (the end portion on the negative side of the Y-axis) of the substrate 11 as shown in FIG. 1B. In other words, the volume of the second thin line 14b is continuously reduced along the direction in which the distance from the other end of the substrate 11 increases.

Here, it is arranged that the volumes of the lower layer thin lines 14 composed of the first thin lines 14a having volumes different from each other and the second thin lines 14b having volumes different from each other are substantially the same.

Further, in the present embodiment, in also the upper layer thin lines 15, 15 adjacent to each other, the first thin lines 15a, 15a are different in volume from each other. Specifically, the volume of the first thin line 15a formed on one side surface 13a of the convex line section 13 is gradually decreased as the distance of the first thin line 15a from one end (the end portion on the negative side of the Y-axis) of the substrate 11 increases and the position of the first thin line 15a comes closer to the other end (the end portion on the positive side of the Y-axis) of the substrate 11 as shown in FIG. 1B. In other words, the volume of the first thin line 15a is continuously reduced along the direction in which the distance from the one end of the substrate 11 increases.

Similarly, in the upper layer thin lines 15, 15 adjacent to each other, the second thin lines 15b, 15b are also different in volume from each other. Specifically, the volume of the second thin line 15b formed on the other side surface 13b of the convex line section 13 is gradually decreased as the distance of the second thin line 15b from the other end (the end portion on the positive side of the Y-axis) of the substrate 11 increases and the position of the second thin line 15b comes closer to the one end (the end portion on the negative side of the Y-axis) of the substrate 11 as shown in FIG. 1B. In other words, the volume of the second thin line 15b is continuously reduced along the direction in which the distance from the other end of the substrate 11 increases.

Here, it is arranged that the volumes of the upper layer thin lines 15 composed of the first thin lines 15a having volumes different from each other and the second thin lines 15b having volumes different from each other are substantially the same.

As described above, the multilayer thin lines 16 composed of the lower layer thin lines 14 having substantially the same volumes and the upper layer thin lines 15 having substantially the same volumes are arranged to have substantially the same volumes, transmit the linearly polarized light (TM wave) oscillating in a direction (the Y-axis direction) perpendicular to the extending direction of the multilayer thin lines 16, and reflect or absorb the linearly polarized light (TE wave) oscillating in the extending direction (the X-axis direction) thereof.

Here, as shown in FIG. 1B, the multilayer thin lines 16 are formed so as to satisfy the following formulas 1 and 2 denoting the pitch of the convex line sections 13 as d, the height of the multilayer thin lines 16 as h1, and the width of each of the multilayer thin lines 16 at a height of h1/2 as b.

$$0.1 \leq h1/d \leq 0.5 \quad (1)$$

$$0.1 \leq b/d \leq 0.9 \quad (2)$$

A manufacturing method of the polarization element 1 according to the present embodiment will hereinafter be explained.

FIGS. 2A through 2C and 3A through 3D are explanatory diagrams of the manufacturing method of the polarization element 1.

Figure 2A:
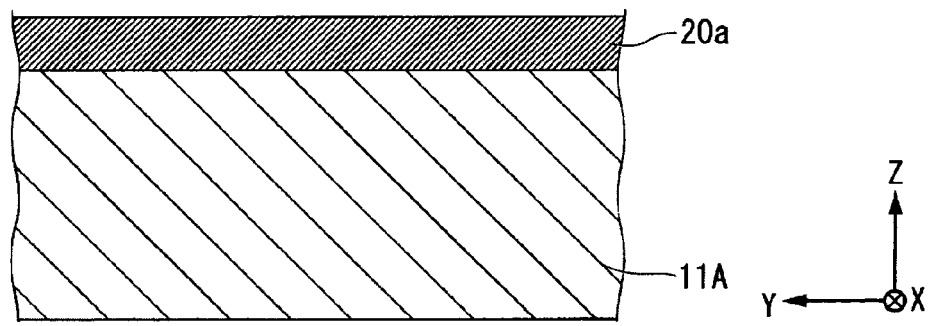
FIGS. 2A through 2C are cross-sectional process charts showing a manufacturing process of the polarization element according to the first embodiment.

Firstly, as shown in FIG. 2A, a substrate material 11A such as a glass substrate is prepared, and a resist material is applied on one surface of the substrate material 11A using a spin coat method and then pre-baked, thereby forming a resist layer 20a. As the resist material, there is used, for example, a chemically-amplified positive photoresist TDUR-P338EM (produced by Tokyo Ohka Kogyo Co., Ltd.). In the present embodiment, the resist layer 20a is formed to have a thickness of about 200 nm, for example.

Figure 2B:
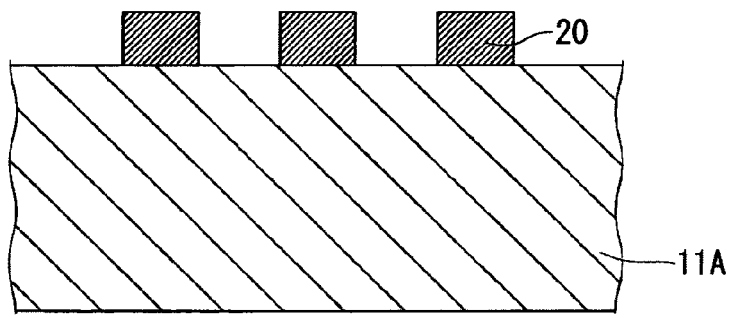

Subsequently, the resist layer 20a is exposed by a two-beam interference exposure method using laser beams with a wavelength of, for example, 266 nm as the exposure light beams. In the two-beam interference exposure method, the resist layer 20a is irradiated with the interfering light, thereby exposing the resist layer 20a with a formation pitch smaller than the wavelength of the laser beam. Subsequently, the resist layer 20a is baked (PEB), and then the resist layer 20a is developed. Thus, as shown in FIG. 2B, the resist 20 having a striped pattern is formed. Further, in the present embodiment, the pitch of the striped pattern of the resist 20 is, for example, 140 nm, and the height thereof is, for example, about 200 nm.

Figure 2C:
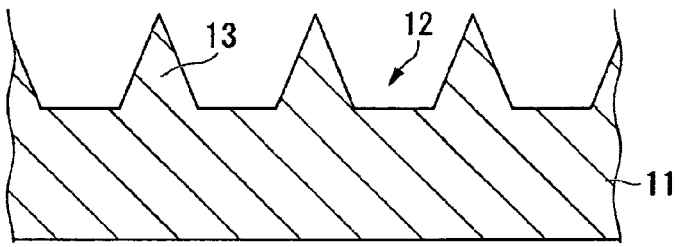

Subsequently, a dry etching process is executed via the resist 20 to dig in the substrate material 11A as deep as about 50 nm through about 300 nm, thereby patterning the substrate material 11A. Then, as shown in FIG. 2C, the substrate 1 having the groove sections 12 and the convex line sections 13 on a processed surface 1a is formed. In the present embodiment, the etching process is performed until the groove sections 12 have a depth of, for example, about 100 nm. Further, in the present embodiment, the etching process is performed using a mixed gas of $C_2F_6$, $CF_4$, and $CHF_3$ as an etching gas, under reactive conditions in which the gas flow rates of $C_2F_6$/$CF_4$/$CHF_3$ are 20/30/30 sccm, respectively, the discharge output is 300 W, the pressure is 5 Pa, and the reaction time is in a range of 30 through 40 sec.

Through the process described above, the plurality of convex line sections 13 forming substantial stripes in a plan view are formed on the one surface of the substrate 11. Here, if the height h of the convex line sections 13 is set so as to satisfy 50 nm $\leq$ h $\leq$ 300 nm, the desired performance can be obtained without unnecessarily degrading the productivity of the polarization element, which is preferable in putting it into commercial production.

Subsequently, the sputtered particles are deposited on the substrate 11 provided with the convex line sections 13 in an oblique direction as shown in FIG. 3A by an opposed target sputtering apparatus using a pair of target made of, for example, Al, to thereby form the first thin lines 14a on the one side surface 13a of the convex line sections 13. It should be noted that in FIGS. 3A through 3D, the incident direction of the sputtered particles is indicated by arrows.

As shown in FIG. 3A, on the surface of the substrate 11, the amount of sputtered particles deposited on the convex line section 13 on the side (the side along the Y-axis direction toward the negative side thereof) closer to the target of the sputtering apparatus becomes larger. Further, the amount of sputtered particles deposited on the convex line section 13 on the side (the side along the Y-axis direction toward the positive side thereof) further from the target becomes smaller. Therefore, there is a tendency that, as shown in FIG. 3A, the volume of the first thin line 14a formed on the one side surface 13a of the convex line section 13 located on the side (the side along the Y-axis direction toward the negative side thereof) closer to the target of the sputtering apparatus becomes larger, and the volume of the first thin line 14a formed on the one side surface 13a of the convex line section 13 located on the side (the side along the Y-axis direction toward the positive side thereof) further from the target becomes smaller.

Therefore, there is caused unevenness in the volume of the first thin line 14a in one direction (the Y-axis direction) on the surface of the substrate 11. Specifically, the first thin lines 14a on the respective convex line sections 13 are formed so that the volumes thereof continuously descend from the side of the one end of the substrate 11 closer to the target of the sputtering apparatus toward the side of the other end of the substrate 11 further from the target.

Therefore, in the present embodiment, as shown in FIG. 3B, the second thin line 14b is formed by depositing the sputtered particles on the other side surface 13b of the convex line section 13 using the opposed target sputtering apparatus from a direction opposite to the direction in which the sputtered particles are deposited when forming the first thin lines 14a. Thus, the thin line 14 composed of the first thin line 14a and the second thin line 14b is formed on each of the convex line sections 13.

In this case, on the substrate 11, the amount of sputtered particles deposited on the convex line section 13 closer to the target of the sputtering apparatus becomes larger, and the amount of sputtered particles deposited on the convex line section 13 further from the target becomes smaller. Therefore, there is a tendency that the volume of the second thin line 14b closer to the target (on the side along the Y-axis direction toward the positive side thereof) becomes larger, and the volume of the second thin line 14b further from the target (on the side along the Y-axis direction toward the negative side thereof) becomes smaller.

Therefore, in the present embodiment, the second thin lines 14b are formed by depositing the sputtered particles from a direction opposite to the direction in which the sputtered particles are deposited when forming the first thin lines 14a. Thus, the unevenness in volume of the first thin lines 14a and the unevenness in volume of the second thin lines 14b can be made opposite to each other. Therefore, the unevenness in volume of the first thin lines 14a is canceled by the unevenness in volume of the second thin lines 14b opposite thereto, and the volumes of the lower layer thin lines 14 composed of the first thin lines 14a and the second thin lines 14b become substantially the same throughout the surface of the substrate 11. Therefore, it is possible to form the lower layer thin lines 14 having a uniform size (volume) on the respective convex line sections 13.

Subsequently, the upper layer thin lines 15 are formed on the lower layer thin lines 14 so as to be stacked thereon using substantially the same process as in the case of the lower layer thin lines 14. Specifically, the opposed target sputtering apparatus using a pair of targets made of a half-metallic material such as Ge, Si, or Mo is firstly prepared. In the present embodiment, Ge is used as the material of the targets. Then, as shown in FIG. 3C, the sputtered particles are deposited on the one side surfaces 13a of the convex line sections 13 in an oblique direction using the sputtering apparatus. Thus, the first thin lines 15a of the upper layer thin lines 15 are formed so as to be stacked on the lower layer thin lines 14.

In this case, on the substrate 11, the amount of sputtered particles deposited on the convex line section 13 closer to the target of the sputtering apparatus becomes larger, and the amount of sputtered particles deposited on the convex line section 13 further from the target becomes smaller. Therefore, there is a tendency that the volume of the first thin line 15a closer to the target (on the side along the Y-axis direction toward the negative side thereof) becomes larger, and the volume of the first thin line 15a further from the target (on the side along the Y-axis direction toward the positive side thereof) becomes smaller.

Therefore, in the present embodiment, as shown in FIG. 3D, the sputtered particles are deposited in a direction opposite to the direction in which the sputtered particles are deposited when forming the first thin lines 15a. Thus, the second thin lines 15b are formed so as to be stacked on the respective lower layer thin lines 14. Thus, the unevenness in volume of the first thin lines 15a and the unevenness in volume of the second thin lines 15b can be made opposite to each other. Therefore, the unevenness in volume of the first thin lines 15a is canceled by the unevenness in volume of the second thin lines 15b opposite thereto, and the volumes of the upper layer thin lines 15 composed of the first thin lines 15a and the second thin lines 15b become substantially the same throughout the surface of the substrate 11. Therefore, it is possible to form the upper layer thin lines 15 having a uniform size (volume) on the respective convex line sections 13.

Through the process described above, each of the plurality of convex line sections 13 can be provided with the multilayer thin line 16 having a uniform volume and composed of the lower layer thin line 14 and the upper layer thin line 15, and the polarization element 1 provided with the convex line sections 13 and the respective multilayer thin lines 16 can be manufactured.

A function of the polarization element 1 according to the present embodiment will hereinafter be explained.

As described above, the polarization element 1 according to the present embodiment has the first thin lines 14a and the second thin lines 14b belonging to the lower layer thin lines 14 and made of the light reflecting material with relatively high light reflectivity such as Al. Further, the first thin lines 15a and the second thin lines 15b belonging to the upper layer thin lines 15 are made of the light absorbing material with relatively high light absorbing property such as Ge.

Therefore, it is possible to ensure the desired light absorbing property by the upper layer thin lines 15 while ensuring the desired light reflecting property by the lower layer thin lines 14. Thus, it is possible to improve the display contrast in the case of applying the polarization element 1 to the liquid crystal display device or the like.

Further, by forming the first thin lines 14a, 15a and the second thin lines 14b, 15b using such materials as described above, the first thin lines 14a and the second thin lines 14b having high light reflectivity can be formed. Further, the first thin lines 15a and the second thin lines 15b having high light absorbing property can be formed. Thus, it is possible to provide the desired light reflecting property and light absorbing property respectively to the lower layer thin lines 14 and the upper layer thin lines 15.

Further, the polarization element 1 according to the present embodiment has the first thin lines 14a and the second thin lines 14b belonging to the lower layer thin lines 14 are formed from the same material, and the first thin lines 15a and the second thin lines 15b belonging to the upper layer thin lines 15 are formed from the same material.

Therefore, it is possible to make the functions of the lower layer thin lines 14 and the upper layer thin lines 15 different from each other. Specifically, it becomes possible to make the lower layer thin lines 14 mainly play the light reflecting function, and the upper layer thin lines 15 play the light absorbing function, as described above. Further, in the case of manufacturing the polarization element 1 using, for example, the opposed target sputtering apparatus, the lower layer thin lines 14 and the upper layer thin lines 15 can be formed using the same target, respectively. Therefore, it is possible to make the formation of the lower layer thin lines 14 and the upper layer thin lines 15 easy to thereby make it easy to manufacture the polarization element 1.

Further, the polarization element 1 according to the present embodiment has the first thin lines 14a belonging to the lower layer thin lines 14 and the first thin lines 15a belonging to the upper layer thin lines 15 formed from respective materials different from each other. Further, the second thin lines 14b belonging to the lower layer thin lines 14 and the second thin lines 15b belonging to the upper layer thin lines 15 are formed from respective materials different from each other.

Therefore, it is possible to make the first thin lines 14a belonging to the lower layer thin lines 14 and the first thin lines 15a belonging to the upper layer thin lines 15 different from each other in light reflecting property and light absorbing property. Further, it is possible to make the second thin lines 14b belonging to the lower layer thin lines 14 and the second thin lines 15b belonging to the upper layer thin lines 15 different from each other in light reflecting property and light absorbing property. Thus, it is possible to adjust the light reflecting property and the light absorbing property of the upper layer thin lines 15 and the lower layer thin lines 14 to thereby adjust the light reflecting property and the light absorbing property of the multilayer thin lines 16.

Further, the polarization element 1 according to the present embodiment has the lower layer thin lines 14, 14 adjacent to each other having the first thin lines 14a, 14a different in volume from each other, and the second thin lines 14b, 14b different in volume from each other, and the lower layer thin lines 14, 14 have substantially the same volumes. Further, the volumes of the first thin lines 14a continuously descend in a direction in which the distance from the one end of the substrate 11 increases, and the volumes of the second thin lines 14b continuously descend in a direction in which the distance from the other end of the substrate 11 increases.

Therefore, the unevenness in the volumes of the first thin lines 14a caused in the direction from the one end of the substrate 11 toward the other end thereof is canceled by the unevenness in the volumes of the second thin lines 14b caused in the direction from the other end of the substrate 11 toward the one end thereof. Therefore, even in the case in which the lower layer thin lines 14 are formed using the oblique sputtering method apt to cause unevenness in the amount of deposition of the sputtered particles depending on the distance from the target, the lower layer thin lines 14 with uniform volumes can be formed.

Further, the polarization element 1 according to the present embodiment has the upper layer thin lines 15, 15 adjacent to each other having the first thin lines 15a, 15a different in volume from each other, and the second thin lines 15b, 15b different in volume from each other, and the upper layer thin lines 15 have substantially the same volumes. Further, the volumes of the first thin lines 15a continuously descend in a direction in which the distance from the one end of the substrate 11 increases, and the volumes of the second thin lines 15b continuously descend in a direction in which the distance from the other end of the substrate 11 increases.

Therefore, the unevenness in the volumes of the first thin lines 15a caused in the direction from the one end of the substrate 11 toward the other end thereof is canceled by the unevenness in the volumes of the second thin lines 15b caused in the direction from the other end of the substrate 11 toward the one end thereof. Therefore, even in the case in which the upper layer thin lines 15 are formed using the oblique sputtering method apt to cause unevenness in the amount of deposition of the sputtered particles depending on the distance from the target, the upper layer thin lines 15 with uniform volumes can be formed.

Further, the polarization element 1 according to the present embodiment uses the metallic material superior in reflectivity such as Al, Au, Ag, Cr, Ti, Ni, W, or Fe as the light reflecting material for forming the lower layer thin lines 14. Further, the polarization element 1 uses the half-metallic material superior in light absorbing property such as Si, Ge, Mo, or Te as the light absorbing material for forming the upper layer thin lines 15.

Therefore, the light reflecting material having the desired reflectivity can be obtained, and the light absorbing material having the desired light absorbing can be obtained. Further, since these half-metallic materials are hard to be oxidized, the polarization element hard to be deteriorated and with high reliability can be obtained. In particular, when the polarization element is used in an application in which the temperature thereof becomes high, although the oxidation reaction is accelerated under the high temperature environment, by using these half-metallic materials, it becomes possible to make the polarization element with high durability.

Further, by making the multilayer thin lines 16 have the multilayer structure composed of the lower layer thin lines 14 and the upper layer thin lines 15, it becomes possible to selectively attenuate the TE wave. In the case in which the upper layer thin lines 15 is the light absorbing layer, and the lower layer thin lines 14 is the light reflecting layer, the TE wave input from the upper layer is attenuated by the light absorbing function of the upper layer thin lines 15, and some of the TE waves are not absorbed, but are reflected by the lower layer thin lines 14 (functioning as a wire grid). The TE wave thus reflected is further attenuated due to the absorption and interference effect exerted when passing through the upper layer. Therefore, due to the selective attenuation effect on the TE wave described above, the desired polarization characteristics can be obtained. It should be noted that in the case in which the functions of the upper layer thin lines 15 and the lower layer thin lines 14 are exchanged, substantially the same advantage can be obtained by inputting the light from the lower layer (the light absorbing layer).

As explained hereinabove, according to the present embodiment, it is possible to obtain the polarization element 1 improving the transmission, the light absorptance, and the display contrast than ever before, and satisfying the required characteristics.

Figure 4A:
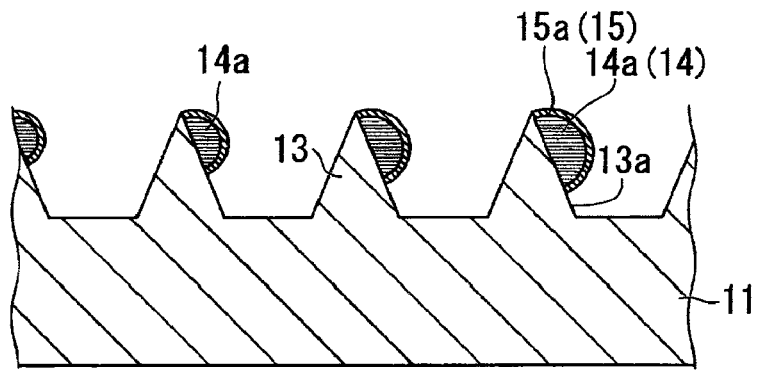
FIGS. 4A through 4C are cross-sectional process charts showing a modified example of the polarization element according to the first embodiment.
Figure 4B:
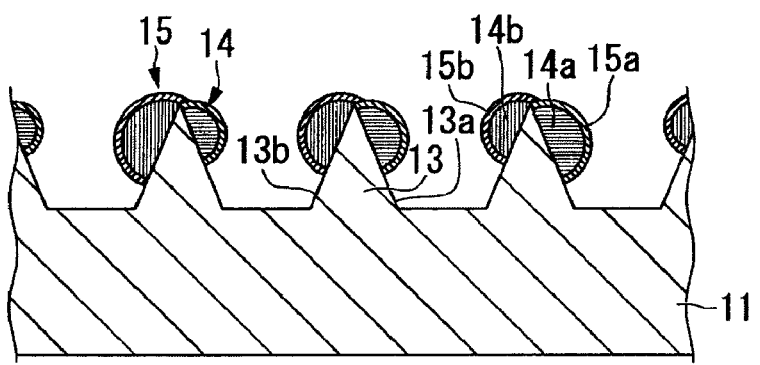
Figure 4C:
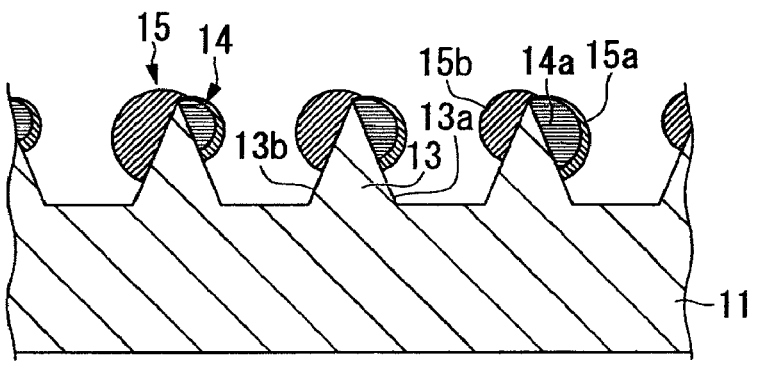

Some modified examples of the present embodiment will hereinafter be explained with reference to FIGS. 4A through 4C. FIGS. 4A through 4C are cross-sectional diagrams of the modified examples of the polarization element, and each correspond to FIG. 3D. In FIG. 3D, the first thin line 14a and the second thin line 14b of the lower layer thin line 14 are not completely covered by the first thin line 15a and the second thin line 15b of the upper layer thin line 15.

However, it is also possible to form only the first thin line 14a of the lower layer thin line 14 on the one side surface 13a of the convex line section 13, and completely cover the entire first thin line 14a of the lower layer thin line 14 with the first thin line 15a of the upper layer thin line 15 formed as a superior layer of the first thin line 14a, as shown in FIG. 4A.

Further, it is also possible to form the first thin line 14a and the second thin line 14b of the lower layer thin line 14 on the respective side surfaces 13a, 13b of the convex line section 13, and form the first thin line 15a and the second thin line 15b of the upper layer thin line 15 so as to completely cover the entire first and second thin lines 14a, 14b, as shown in FIG. 4B.

Further, it is also possible to form only the first thin line 14a of the lower layer thin line 14 on the one side surface 13a of the convex line section 13, and form the first thin line 15a and the second thin line 15b of the upper layer thin line 15 so as to completely cover the entire first thin line 14a, as shown in FIG. 4C.

In the modified examples shown in FIGS. 4A through 4C, in the case in which the lower layer thin lines 14 are formed from the light reflecting material such as Al and the upper layer thin lines 15 are formed from the light absorbing material such as Ge, there is made the state in which the light reflecting material is completely covered by the light absorbing material. Therefore, it is possible to prevent oxidation of the light reflecting material such as Al even under the high-temperature environment of not lower than 200° C. to thereby prevent the polarization splitting function from being deteriorated.

Second Embodiment

A polarization element according to a second embodiment of the invention will hereinafter be explained with reference to the accompanying drawings.

Figure 5A:
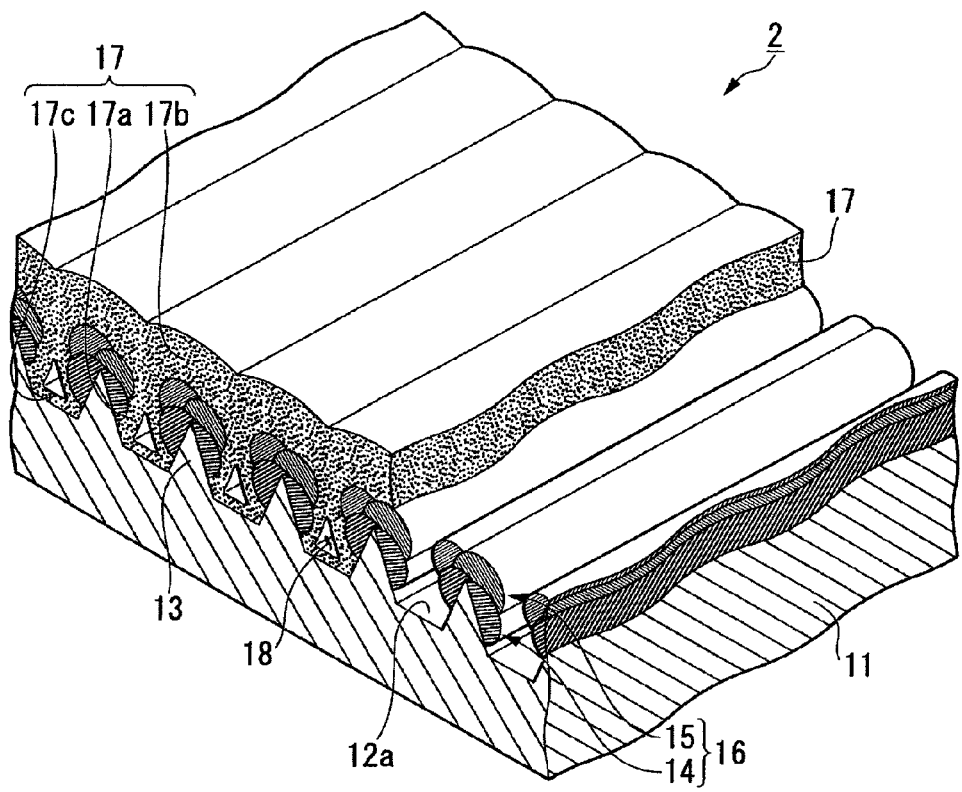
FIGS. 5A and 5B are enlarged diagrams of a manufacturing device of a polarization element according to a second embodiment of the invention.
Figure 5B:
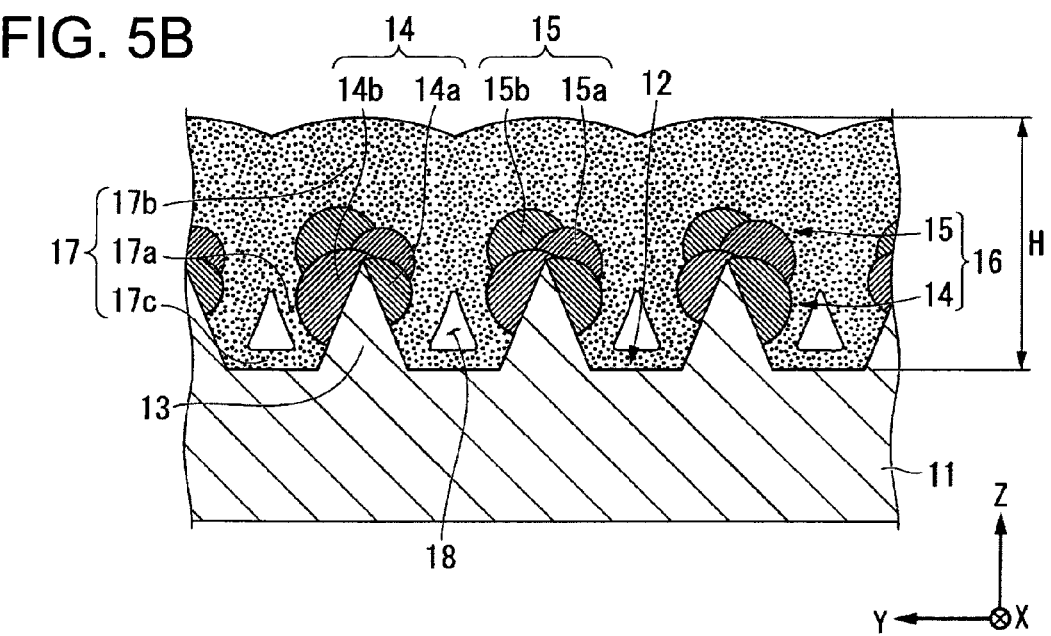

FIG. 5A is a schematic perspective view showing a schematic configuration of the polarization element according to the present embodiment, and FIG. 5B is a schematic cross-sectional view of the polarization element when cutting the polarization element by the Y-Z plane. The polarization element 2 according to the present embodiment is different from the polarization element 1 according to the first embodiment in that there is provided a protective film for covering the surfaces of the multilayer thin lines 16. Since the other points are substantially the same as those of the first embodiment, the same sections are denoted as the same reference symbols, and explanations therefor will be omitted.

As shown in FIG. 5A, the polarization element 2 is provided with a protective film 17 for covering the substrate 11 and the surfaces of the multilayer thin lines 16. The protective film 17 is formed of a translucent insulating film such as a silicon oxide film. The protective film 17 is provided with first protective films 17a covering the both side surfaces of the convex line sections 13 and the multilayer thin lines 16 and extending in the X-axis direction, second protective films 17b covering the upper portions of the multilayer thin lines 16 and extending in the X-axis direction, and third protective films 17c covering the bottom surfaces 12a of the groove sections 12 and extending in the X-axis direction.

The second protective films 17b are connected to each other in the Y-axis direction, and the plurality of second protective films 17b cover the entire upper surfaces of the multilayer thin lines 16 in an integrated manner. An area surrounded by the first protective film 17a, the second protective film 17b, and the third protective film 17c forms a void section 18, and the inside of the void section 18 is kept vacuum, or filled with air or a raw material gas used when forming the protective film 17. The surfaces of the second protective films 17b on the side opposite to the substrate 11 reflect the patterns of the multilayer thin lines 16, and slightly wave, wherein the portions overlapping the multilayer thin lines 16 in a plan view rise, and the portions overlapping the void sections 18 hollow.

Further, as shown in FIG. 5B, the height H from the bottom surfaces 12a to the upper surface (the upper surface of the protective film 17) of the second protective film 17b is, for example, 300 nm. In the case of the present embodiment, although the configuration of connecting the adjacent second protective films 17b is adopted, the second protective films 17b are not necessarily required to be connected to each other. For example, it is also possible to adopt the configuration in which a slight void is formed between the second protective films 17b, for example. In this case, the protective film 17 is formed for each of the multilayer thin lines 16, and a large number of protective films 17 extending in the X-axis direction are arranged in the Y-axis direction at constant intervals.

The thickness (the thickness in the Y-axis direction) of the first protective film 17a is arranged to be the thickness with which the first protective films 17a adjacent to each other in the Y-axis direction are not contact to each other (i.e., the void section 18 is formed between the first protective films 17a adjacent to each other). Further, the width of the second protective film 17b in the Y-axis direction is formed to be greater than the width in the Y-axis direction of the convex line section 13 and the multilayer thin line 16 including the first protective film 17a. Further, the third protective film 17c is formed integrally with the first protective film 17a and the second protective film 17b. The space surrounded by the first protective films 17a, the second protective film 17b, and the third protective film 17c corresponds to the void section 18.

A manufacturing method of the polarization element 2 according to the present embodiment will hereinafter be explained.

FIGS. 6A through 6D are explanatory diagrams of the manufacturing method of the polarization element 2. Since the manufacturing process of the polarization element 2 of the present embodiment can be used commonly to the manufacturing method of the polarization element 1 of the first embodiment until the process of forming the multilayer thin lines 16 is completed, the explanations therefor will be omitted here. The process of forming the protective film 17 will hereinafter be explained. FIGS. 6A through 6D correspond to FIGS. 3A through 3D of the first embodiment.

Firstly, as shown in FIG. 6A, the protective film is deposited on the multilayer thin lines 16 using a CVD method. Here, as the method of forming the protective film 17, an evaporation method and a sputtering method can be cited as typically used methods besides the CVD method. However, in the case of using the evaporation method, the emission angle of the particle emitted from the position where the film raw material is disposed in the apparatus used for the evaporation to the surface on which the protective film is formed is varied depending on the location on the surface on which the protective film is formed, and the distance between the film raw material and the surface on which the protective film is formed is not exactly constant. Therefore, a difference is caused in the thickness of the protective film to be manufactured, and the quality of the polarization element is varied. Further, since the deposition rate of the sputtering method is significantly slow, the deposition rate assumed in the invention is not achievable. Therefore, the invention is achievable in the case of performing the deposition using the CVD method.

As shown in FIG. 6A, the substrate 11 provided with the multilayer thin lines 16 is disposed under the operation environment of the CVD method, and then the raw material gas 17g of the protective film 17 is supplied. The raw material gas 17g pervades the bottom surface 12a to thereby form the protective film 17. In the present embodiment, it is assumed that a silicon oxide is formed as the protective film 17, and that a mixed gas of TEOS and oxygen ($O_2$) is used as the raw material gas 17g. In the drawings, TEOS and $O_2$ are not separately described, but are both illustrated as the raw material gas 17g.

As the protective film 17, an insulating material such as silicon nitride (SiN), silicon nitrogen oxide (SiON), alumina ($Al_2O_3$) can be used besides the silicon oxide, and an appropriate material can be selected as the raw material gas 17g in accordance with the protective film 17 to be selected. Further, as the CVD method, both of a thermal CVD method and a plasma CVD method can be used. In the present embodiment, it is assumed to use the plasma CVD method. The reaction conditions of the present embodiment are as follows. For example, the gas flow rate (TEOS/$O_2$) is 12/388 sccm, the output is 400 W, the pressure is 40 Pa, the reaction temperature is 110° C., and the reaction time is 2 min.

As shown in the drawing, when the raw material gas 17g is made to react, the protective film 17 to be generated by the chemical reaction is deposited on the surfaces of the multilayer thin lines 16 and the substrate 11 adjacent to each other.

The deposition rate of the protective film is, for example, 100 nm/min. In the initial stage of the deposition, the protective film 17 is deposited on the bottom surface 12a, the surfaces of the convex line sections 13, and the outer periphery of the multilayer thin lines 16. When the reaction progresses, the protective film 17 grows so as to encompass the multilayer thin lines 16. Further, the distance between the protective films 17 formed on the periphery of the multilayer thin lines 16 adjacent to each other is gradually narrowed as much as the thickness of the protective film 17 increased by the growth.

Subsequently, as shown in FIG. 6B, when the reaction further progresses, since the gap between the multilayer thin lines 16 adjacent to each other is narrowed as much as the thickness of the protective film 17, it becomes hard for the raw material gas 17g to enter the groove section 12. Therefore, the reaction of the raw material gas 17g progresses in sequence on the protective film 17 formed on the multilayer thin lines 16 before entering the groove section 12, and the formation of the protective film 17 progresses on the multilayer thin lines 16 with priority.

Here, in the case in which the reaction rate is low, since enough time for the raw material gas 17g to pervade the groove section 12 can be provided even if the gap between the multilayer thin lines 16 is narrowed due to the thickness of the protective film 17, it is prevented to form the protective film 17 on the multilayer thin lines 16 with priority, but the reaction progresses on the entire surface. Therefore, the groove section 12 is gradually buried with the protective film 17 thus formed. Since the structure with the groove sections 12 buried as described above is not preferable in view of the optical characteristic, it is arranged in the present embodiment that the reaction rate is raised to thereby remain the void between the multilayer thin lines 16.

Further, the multilayer thin lines 16 according to the embodiment of the invention are formed so as to project from the both side surfaces of each of the convex line sections 13 in the Y-axis direction like eaves. In order for depositing the protective film 17 around the lower end portion of the multilayer thin line 16 denoted as the reference symbol 16c in the surface of the multilayer thin line 16 having such a shape, it is required for the raw material gas 17g to infiltrate the inside of the groove section 12, and go around the multilayer thin line 16 to reach the lower end portion 16c. Therefore, the multilayer thin line 16 has a structure in which the protective film 17 is hard to be deposited on the lower end portion 16c. Depending on the reaction conditions, it is also possible to expose the multilayer thin line 16 to the void section 18 in the lower end section 16c.

As shown in FIG. 6C, when the reaction further progresses, the protective films 17 continuously growing on the multilayer thin lines 16 adjacent to each other come in contact with each other on the adjacent multilayer thin lines 16. Thus, between the multilayer thin lines 16 adjacent to each other, there is formed the void section 18 surrounded by the protective film 17.

As shown in FIG. 6D, when the reaction further progresses, the surface of the protective film 17 gradually comes to be flat, and the thick protective film 17 can be formed. In the manner as described above, the polarization element 2 according to the present embodiment is completed.

According to the polarization element 2 having the configuration described above, since the multilayer thin lines 16 are protected by the protective film 17, the multilayer thin lines 16 can be prevented from being oxidized, and further, since the void sections 18 are formed in the areas between the convex line sections 13 and the multilayer thin lines 16, the polarization element 2 having high reliability and superior optical characteristics can be obtained.

Further, according to the present embodiment, the second protective films 17b disposed above the adjacent multilayer thin lines 16 are arranged to have contact with each other in a direction parallel to the arranging axis direction. Therefore, the void sections 18 capable of encapsulating the air or an ambient gas (or being kept vacuum) in the manufacturing process are formed between the metallic thin lines, and thus the polarization element 2 provided with superior optical characteristics can be obtained.

Further, in the present embodiment, it is assumed that the protective film 17 is formed from the translucent insulating material. Since the multilayer thin lines 16 are covered with the insulating material to be isolated from the periphery, when setting the polarization element 2 in a device, for example, the multilayer thin lines 16 can be prevented from having electrical contact with the wiring of the device.

Further, according to the manufacturing method of the polarization element 2 having such a configuration as described above, it is assumed that the CVD method is used for forming the protective film 17 for preventing the oxidation degradation or damage of the multilayer thin lines 16. Due to the characteristic of the CVD method of high deposition rate, when the deposition progresses, the deposition reaction begins prior to the raw material gas 17g pervading the void sections 18, and the protective film grows on the upper end portions of the multilayer thin lines 16 with priority. Then, the film growth between the multilayer thin lines 16 stops, and the area between the multilayer thin lines 16 is prevented from being buried with the protective film 17, thus the polarization element 2 having superior optical characteristics can easily be manufactured.

It should be noted that although in the present embodiment, it is assumed that the multilayer thin lines 16 are protected by only the protective film 17, it is also possible to stack a plurality of deposition films additionally on the protective film 17.

Projection Display Device

Figure 7:
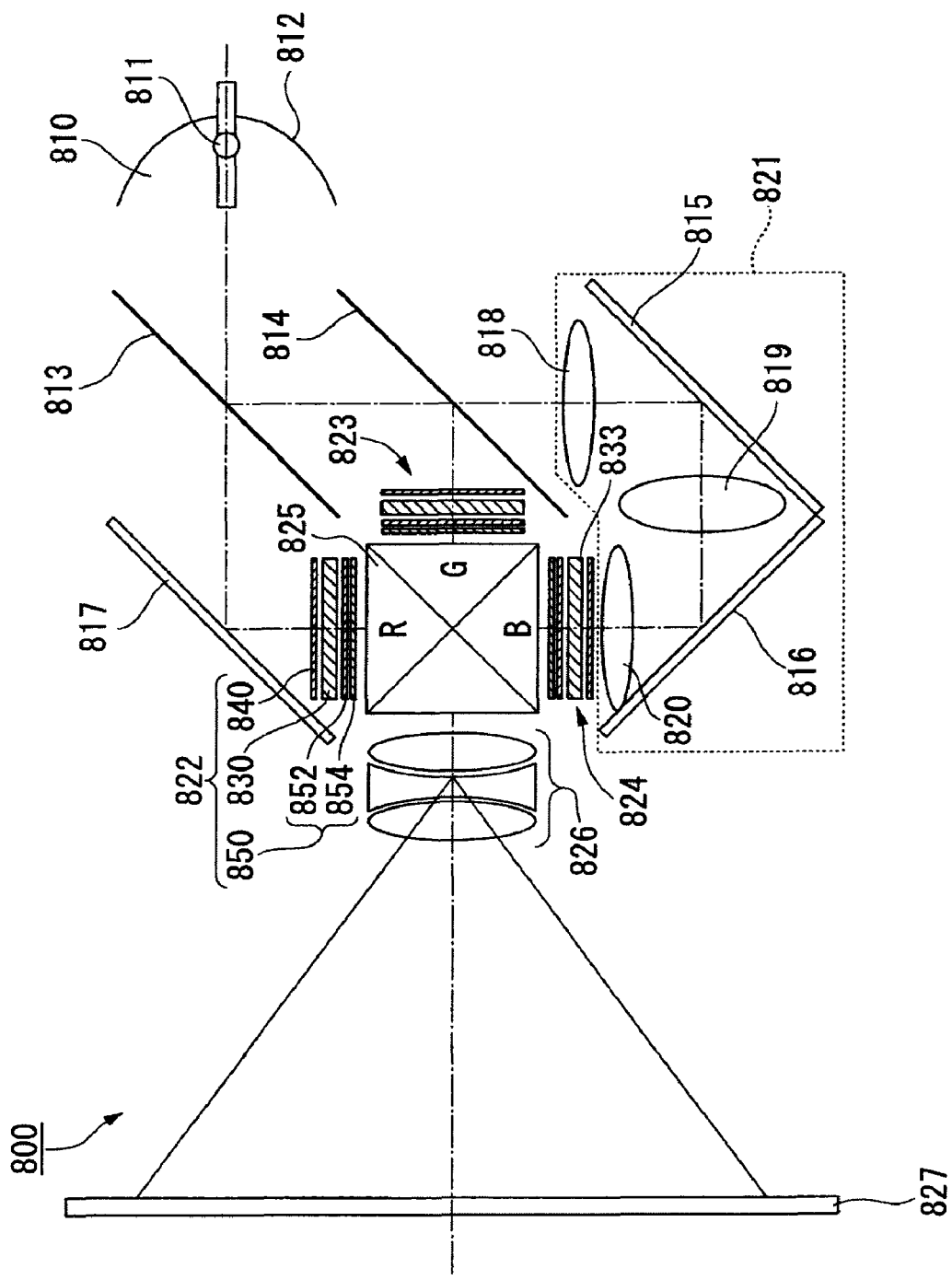
FIG. 7 is a schematic diagram of a projector as an example of an electronic apparatus.

An electronic apparatus according to an embodiment of the invention will hereinafter be explained. A projector 800 shown in FIG. 7 has a light source 810, dichroic mirrors 813, 814, reflecting mirrors 815, 816, 817, an entrance lens 818, a relay lens 819, an exit lens 820, light modulation sections 822, 823, 824, a cross dichroic prism 825, and a projection lens 826.

The light source 810 is composed of a lamp 811 such as a metal halide lamp, and a reflector 812 for reflecting the light of the lamp. It should be noted that as the light source 810, a super-high pressure mercury lamp, a flash mercury lamp, a high-pressure mercury lamp, a deep UV lamp, a xenon lamp, a xenon flash lamp, and so on can also be used besides the metal halide lamp.

The dichroic mirror 813 transmits red light included in white light emitted form the light source 810, and reflects blue light and green light. The red light thus transmitted is reflected by the reflecting mirror 817, and input to the light modulation section 822 for the red light. Further, the green light out of the blue light and the green light both reflected by the dichroic mirror 813 is reflected by the dichroic mirror 814, and is input to the light modulation section 823 for the green light. The blue light is transmitted through the dichroic mirror 814, and is input to the light modulation section 824 for the blue light via the relay optical system 821 provided for preventing the light loss due to a long light path, and including the entrance lens 818, the reflecting mirror 815, the relay lens 819, the reflecting mirror 816, and exit lens 820.

The light modulating sections 822 through 824 each have an entrance side polarization element 840 and an exit side polarization element section 850 disposed on the both sides of a liquid crystal light valve 830 so as to sandwich the liquid crystal light valve 830. The entrance side polarization element 840 and the exit side polarization element section 850 are arranged so as to have the respective transmission axes perpendicular to each other (the cross-Nicol arrangement).

The entrance side polarization element 840 is a reflective type polarization element, and reflects the light having the oscillation direction perpendicular to the transmission axis.

On the other hand, the exit side polarization element section 850 has a first polarization element (a pre-polarization plate, a pre-polarizer) 852, and a second polarization element 854. As the first polarization element 852, there is used the polarization element according to the second embodiment of the invention described above, provided with the protective film and having high heat resistance. Further, the second polarization element 854 is a polarization element having an organic material as the constituent material. Both of the polarization elements used in the exit side polarization element section 850 are the absorbing type polarization elements, and the polarization elements 852, 854 absorb the light in cooperation with each other. It should be noted that it is also possible to use the polarization element according to the first embodiment of the invention as the first polarization element 852.

In general, the absorbing type polarization element formed of an organic material is easily deteriorated by heat, and therefore, hard to be used as a polarization section of a high-power projector requiring high luminance. However, in the projector 800 of the embodiment of the invention, the first polarization element 852 formed of an inorganic material having high heat resistance is disposed between the second polarization element 854 and the liquid crystal light valve 830, and the polarization elements 852, 854 absorb the light in cooperation with each other. Therefore, the deterioration of the second polarization element 854 formed of an organic material can be prevented.

The three colored light beams modulated by the respective light modulation sections 822 through 824 are input to the cross dichroic prism 825. The cross dichroic prism 825 is composed of four rectangular prisms bonded to each other, and on the interface therebetween, there are formed a dielectric multilayer film for reflecting the red light and a dielectric multilayer film for reflecting the blue light to have an X shape. The three colored light beams are combined by these dielectric multilayer films to form a light beam for representing a color image. The light beam obtained by combining the three colored light beams is projected on a screen 827 by the projection lens 826 as a projection optical system, thus the image is displayed in an enlarged manner.

Since the projector 800 having such a configuration as described above is arranged to use the polarization element according to the embodiment of the invention described above as the exit side polarization element section 850, even if the high power light source is used, deterioration of the polarization element can be prevented. Therefore, the projector 800 can be made to have high reliability and superior display characteristics.

Liquid Crystal Device

Figure 8:
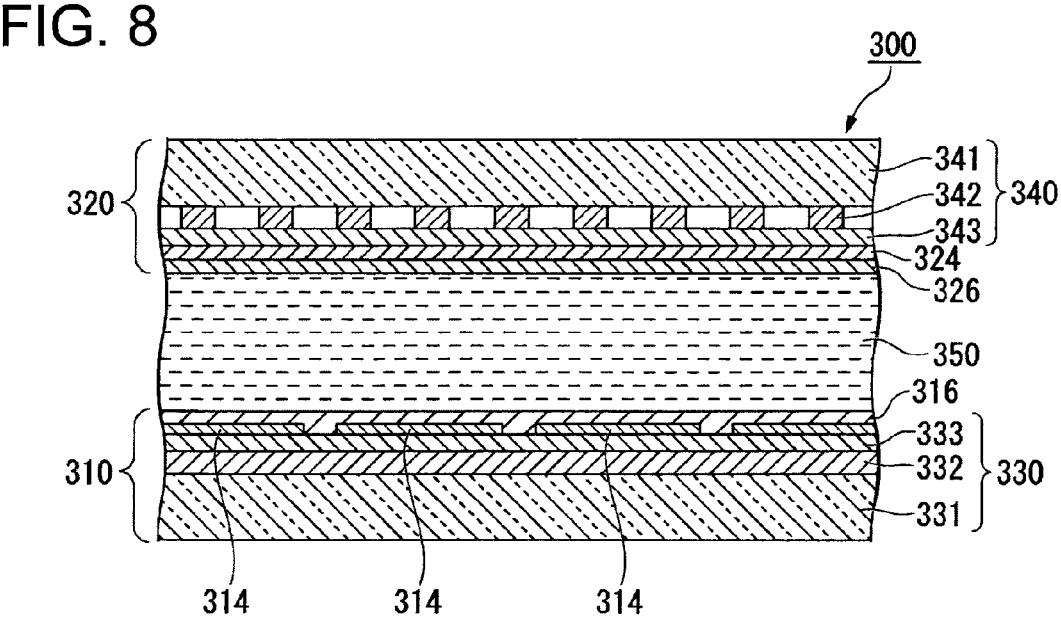
FIG. 8 is a schematic configuration diagram showing an example of a liquid crystal device equipped with the polarization element of the present embodiment.

FIG. 8 is a schematic cross-sectional view showing an example of the liquid crystal device 300 equipped with the polarization element according to the embodiment of the invention. The liquid crystal device 300 according to the present embodiment is configured to have a liquid crystal layer 350 sandwiched between an element substrate 310 and an opposed substrate 320.

The element substrate 310 and the opposed substrate 320 are provided with polarization elements 330, 340, respectively. The polarization elements 330, 340 are each the polarization element according to the second embodiment described above, and has a structure in which the metallic thin lines provided with the protective film are formed on a translucent substrate such as glass substrate, a quartz substrate, or a plastic substrate.

The polarization element 330 is provided with a substrate main body 331, the metallic thin lines 332, and the protective film 333, and the polarization element 340 is provided with a substrate main body 341, the metallic thin lines 342, and the protective film 343, respectively. In the present embodiment, the substrate main bodies 331, 341 are substrates of the polarization elements, and at the same time, the substrates of the liquid crystal device. Further, the metallic thin lines 332 and the metallic thin lines 342 are disposed so as to intersect each other. Either of the polarization elements has the metallic thin lines disposed on an inner surface side (the liquid crystal layer 350 side).

On the inner surface side of the polarization element 330, there are provided the pixel electrodes 314, wiring not shown, and TFT elements, and further, an oriented film 316 is also provided. Similarly, on the inner surface side of the polarization element 340, there are disposed a common electrode 324 and an oriented film 326.

In the liquid crystal device having such a configuration, since the substrate main bodies 331, 341 have both of the functions of the substrate for the liquid crystal device and the substrate for the polarization element, the number of components can be reduced. Therefore, the entire device can be made thinner, and the function of the liquid crystal device 300 can be improved. Further, since the device structure can be simplified, manufacturing becomes easier, and at the same time, the cost reduction can be achieved.

It should be noted that although in the liquid crystal device according to the present embodiment, it is assumed that the polarization element according to the second embodiment is used, the polarization element according to the first embodiment not provided with the protective film can also be used. On that occasion, it is preferable to provide protective layers for protecting the respective polarization elements separately at the positions of the protective films 333, 334.

Electronic Apparatus

Figure 9:
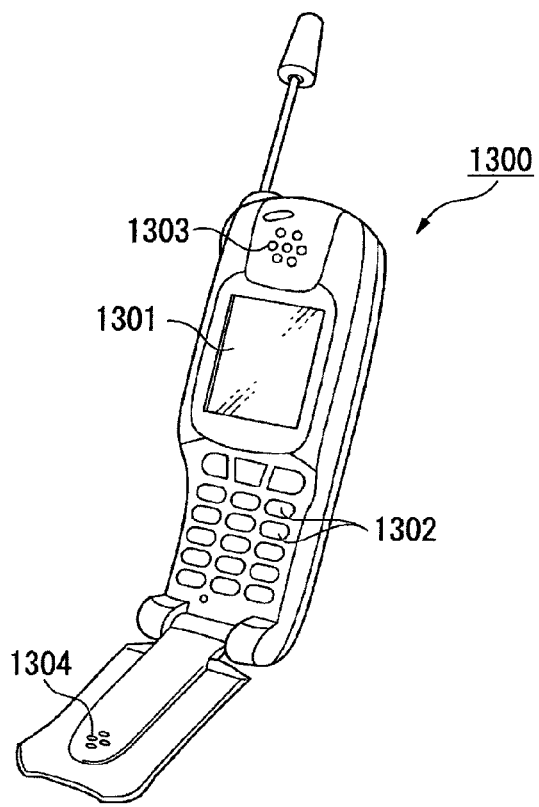
FIG. 9 is a perspective view of a cellular phone as an example of the electronic apparatus.

An electronic apparatus according to another embodiment of the invention will hereinafter be explained. FIG. 9 is a perspective view showing an example of the electronic apparatus using the liquid crystal device shown in FIG. 8. A cellular phone (an electronic apparatus) 1300 shown in FIG. 9 is configured including the liquid crystal device according to the embodiment of the invention as a small-sized display section 1301, a plurality of operation buttons 1302, an ear piece 1303, and a mouthpiece 1304. Thus, the cellular phone 1300 equipped with the display section superior in reliability and capable of high-quality display can be provided.

Further, the liquid crystal device according to the embodiment of the invention can preferably be used as an image display section of an electronic book, a personal computer, a digital still camera, a liquid crystal television, a projector, a video cassette recorder of either a view-finder type or a direct view type, a car navigation system, a pager, a personal digital assistance, an electronic calculator, a word processor, a workstation, a picture phone, a POS terminal, a device equipped with a touch panel, and so on, besides the cellular phone described above.

It should be noted that the present invention is not limited to the embodiments described above, but can be modified in various manners in practical use within a scope or spirit of the invention.

For example, in the polarization element explained in the embodiments described above, in order for making the materials of the lower layer thin lines and the upper layer thin lines different from each other, the first thin lines and the second thin lines belonging to the lower layer thin lines are formed from the same material, and at the same time, the first thin lines and the second thin lines belonging to the upper layer thin lines are formed from the same material. However, in the case of making the materials of the first thin lines belonging to the lower layer thin lines and the first thin lines belonging to the upper layer thin lines different from each other, and making the materials of the second thin lines belonging to the lower layer thin lines and the second thin lines belonging to the upper layer thin lines different from each other, it is also possible to adopt the following combination, for example. The first thin lines of the lower layer thin lines and the second thin lines of the upper layer thin lines are formed from the same material, and the second thin lines of the lower layer thin lines and the first thin lines of the upper layer thin lines are formed from the same material. Thus, it becomes possible to alternate the material of the first thin lines and the material of the second thin lines in each of the lower layer thin lines and the upper layer thin lines, to thereby control the light reflecting property and the light absorbing property of the multilayer thin lines. Further, it is also possible to form the first thin lines and the second thin lines of the lower layer thin lines, and the first thin lines and the second thin lines of the upper layer thin lines from the respective materials different from each other.

Further, although in the present embodiment it is assumed that the convex line section 13 has the triangular cross-sectional shape, the cross-sectional shape is not limited thereto. It is also possible to adopt various cross-sectional shapes such as a rectangle or a trapezoid, besides the shapes shown in the drawings.

Further, the materials for forming the thin lines are not limited to those mentioned in the embodiments described above. For example, it is also possible to use an alloy mainly containing a metallic material having a reflecting property such as aluminum as the material for forming the thin lines if necessary.

Further, it is also possible to use, for example, aluminum, germanium, molybdenum as the material of the target of the sputtering apparatus, and to deposit the thin lines made of these materials or the thin lines made of different materials by arbitrarily combining these materials.

Further, as the material of the substrate, the translucent material such as quartz or plastic can be used besides the glass. Since the polarization element accumulates heat to become in a high temperature state depending on the purpose to which the polarization element is applied, the substrate preferably has glass or quartz having high heat resistance as the constituent material.

The entire disclosure of Japanese Patent Application No. 2009-054118, filed Mar. 6, 2009 is expressly incorporated by reference herein.

What is claimed is:

1. A polarization element comprising:
   a substrate;
   a plurality of convex line sections disposed on one surface of the substrate so as to form substantial stripes in a plan view; and
   a multilayer thin line provided to each of the convex line sections and extending along an extending direction of the convex line sections,
   wherein the multilayer thin line has a lower layer thin line disposed on the convex line section, and an upper layer thin line stacked on the lower layer thin line,
   the lower layer thin line and the upper layer thin line each have a first thin line disposed on one side surface out of both side surfaces in a direction along a shorter dimension of the convex line section, and a second thin line disposed on the other side surface,
   materials of the first thin line belonging to the lower layer thin line and the first thin line belonging to the upper layer thin line are different from each other, and
   materials of the second thin line belonging to the lower layer thin line and the second thin line belonging to the upper layer thin line are different from each other.

2. The polarization element according to claim 1, wherein the materials of the first thin line and the second thin line belonging to the lower layer thin line are the same, and the materials of the first thin line and the second thin line belonging to the upper layer thin line are the same.

3. The polarization element according to claim 1, wherein the entire lower layer thin line is covered by the upper layer thin line.

4. The polarization element according to claim 1, wherein the first thin line and the second thin line are made of one of a light reflecting material having a relatively high light reflecting property and a light absorbing material having a relatively high light absorbing property.

5. The polarization element according to claim 4, wherein the first thin line and the second thin line belonging to the lower layer thin line are made of the light reflecting material, and the first thin line and the second thin line belonging to the upper layer thin line are made of the light absorbing material.

6. The polarization element according to claim 1, wherein in the lower layer thin lines adjacent to each other, volumes of the first thin lines are different from each other, volumes of the second thin lines are different from each other, and volumes of the lower layer thin lines are substantially the same as each other,
   the volumes of the first thin lines continuously descend in a direction in which a distance from one end of the substrate increases, and
   the volumes of the second thin lines continuously descend in a direction in which a distance from the other end of the substrate increases.

7. The polarization element according to claim 1, wherein in the upper layer thin lines adjacent to each other, volumes of the first thin lines are different from each other, volumes of the second thin lines are different from each other, and volumes of the upper layer thin lines are substantially the same as each other,
   the volumes of the first thin lines continuously descend in a direction in which a distance from one end of the substrate increases, and
   the volumes of the second thin lines continuously descend in a direction in which a distance from the other end of the substrate increases.

8. The polarization element according to claim 1, further comprising:

a protective film covering the convex line sections and the multilayer thin lines, wherein in an area between the convex line sections and the multilayer thin lines adjacent to each other, there is formed a void section unfilled with the protective film.

9. The polarization element according to claim 8, wherein the protective films respectively covering the convex line sections and the multilayer thin lines adjacent to each other have contact with each other at the top of the void section to cover the void section.

10. The polarization element according to claim 8, wherein the protective film is formed from a translucent insulating material.

11. The polarization element according to claim 4, wherein the light reflecting material is selected from the group consisting of aluminum, gold, silver, copper, chromium, titanium, nickel, tungsten, and iron, and the light absorbing material is selected from the group consisting of silicon, germanium, molybdenum, and tellurium.

12. A polarization element comprising:

a substrate including a convex line section extending in a first direction;

a lower thin line including a first lower thin line disposed on one side of the convex line and a second lower thin line disposed on the other side of the convex line, the lower thin line extending in the first direction; and a upper thin line including a first upper thin line stacked on the first lower thin line and a second upper thin line stacked on the second lower thin line, the upper thin line extending in the first direction, wherein materials of the first lower thin line and the first upper thin line are different from each other, and materials of the second lower thin line and the second upper thin line are different from each other.

13. A projection display device comprising:

the polarization element according to claim 12.

* * * * *